United States Patent
Auer (10) Patent No.: US 10,447,521 B2
(45) Date of Patent: Oct. 15, 2019

(54) COMBINING SIGNAL STREAMS USING FREQUENCY COMPONENTS

(71) Applicant: TELEFONAKTIEBOLAGET LM ERICSSON (PUBL), Stockholm (SE)

(72) Inventor: Gunther Auer, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 56 days.

(21) Appl. No.: 15/580,364

(22) PCT Filed: Jun. 29, 2015

(86) PCT No.: PCT/SE2015/050758
§ 371 (c)(1),
(2) Date: Dec. 7, 2017

(87) PCT Pub. No.: WO2017/003326
PCT Pub. Date: Jan. 5, 2017

(65) Prior Publication Data
US 2019/0132178 A1 May 2, 2019

(51) Int. Cl.
*H04L 27/26* (2006.01)
*H04L 5/00* (2006.01)

(52) U.S. Cl.
CPC .......... *H04L 27/2637* (2013.01); *H04L 5/003* (2013.01); *H04L 5/0064* (2013.01);
(Continued)

(58) Field of Classification Search
CPC ............... H04L 27/2637; H04L 5/0064; H04L 27/2628; H04L 27/2636; H04L 5/001
(Continued)

(56) References Cited

U.S. PATENT DOCUMENTS

| 9,313,063 B1* | 4/2016 | Jia ...................... H04L 27/2605 |
| 2006/0250935 A1* | 11/2006 | Hamamoto .......... H04L 5/0032 370/203 |

(Continued)

OTHER PUBLICATIONS

Ahmed Haddad et al., "Radio-over-Fiber (RoF) for Mobile Backhauling: a technical and economic comparison between Analog and Digitized RoF", IEEE International Conference on Optical Network Design and Modeling, May 19-22, 2014, Stockholm Sweden, pp. 132-137.

(Continued)

*Primary Examiner* — Christopher R Crompton
(74) *Attorney, Agent, or Firm* — Patent Portfolio Builders PLLC (57) ABSTRACT

It is provided a method for combining signal streams in a point-to-point transmitter comprising a plurality of frequency component inputs and a transmitter output. The method is performed in the point-to-point transmitter and comprises the steps of: receiving a first set of data subcarriers for a first signal stream on respective frequency component inputs, the first signal stream intended to be transmitted on a first carrier; receiving a second set of data subcarriers for a second signal stream on respective frequency component inputs, the second signal stream intended to be transmitted on a second carrier; combining all frequency component inputs to one output signal by performing an inverse fast Fourier transform of all frequency component inputs and a parallel to serial conversion; and providing the output signal on the output for transmission to a point-to-point receiver over a point-to-point medium.

27 Claims, 5 Drawing Sheets

(52) U.S. Cl.
CPC ...... *H04L 27/2601* (2013.01); *H04L 27/2628* (2013.01); *H04L 27/2636* (2013.01); *H04L 5/001* (2013.01)

(58) Field of Classification Search
USPC .......................................................... 370/329
See application file for complete search history.

(56) References Cited

U.S. PATENT DOCUMENTS

| | | | | |
|---|---|---|---|---|
| 2009/0243932 | A1* | 10/2009 | Moshfeghi | G01S 5/14 342/378 |
| 2013/0089063 | A1* | 4/2013 | Yang | H04L 5/0023 370/329 |
| 2014/0153625 | A1* | 6/2014 | Vojcic | H04L 1/005 375/224 |
| 2016/0094318 | A1* | 3/2016 | Shattil | H04B 7/026 375/267 |
| 2016/0182101 | A1* | 6/2016 | Markovic | H04L 27/364 375/296 |
| 2018/0176788 | A1* | 6/2018 | Yeo | H04L 27/263 |
| 2018/0278452 | A1* | 9/2018 | Yang | H04L 27/2614 |
| 2019/0028304 | A1* | 1/2019 | Rode | H04L 23/02 |

OTHER PUBLICATIONS

Neda Cvijetic et al., "Novel Optical Access and Digital Processing Architectures for Future Mobile Backhaul", Journal of Lightwave Technology, Feb. 15, 2013, pp. 621-627, vol. 31, No. 4.

3GPP TS 36.211 V115.0, 3rd Generation Partnership Project; Technical Specification Group Radio Access Network; Evolved Universal Terrestrial Radio Access (E-UTRA); Physical channels and modulation (Release 11), Dec. 2013.

International Search Report and Written Opinion, dated Mar. 3, 2016, from corresponding PCT Application No. PCT/SE2015/050758.

* cited by examiner

COMBINING SIGNAL STREAMS USING FREQUENCY COMPONENTS

TECHNICAL FIELD

The invention relates to methods, transmitters, receivers, computer programs and computer program products for combining and extracting signal streams using frequency components when transmitted over a point-to-point medium.

BACKGROUND

The topology of cellular networks increases in complexity. For instance, remote radio heads can be used in locations where traditional deployment with antennas being co-located with the radio base stations is not ideal. For example, such a distributed transmission system is particularly useful to increase coverage and reduce handovers in areas with a large concentration of subscribers, such as in office buildings, shopping centres, train stations, airports, arenas, etc.

However, in distributed transmission systems for cellular networks, the connection used between a radio base station and the remote radio heads is constrained in capacity. Any excess capacity usage would require a new cable to be pulled to the remote radio head which results in significant costs.

SUMMARY

It would be of great benefit if there was a way to more efficiently convey data over a point-to-point medium, e.g. between a radio base station and a remote radio head.

According to a first aspect, it is provided a method for combining signal streams in a point-to-point transmitter comprising a plurality of frequency component inputs and a transmitter output. The method is performed in the point-to-point transmitter and comprises the steps of: receiving a first set of data subcarriers for a first signal stream on respective frequency component inputs, the first signal stream intended to be transmitted on a first carrier; receiving a second set of data subcarriers for a second signal stream on respective frequency component inputs, the second signal stream intended to be transmitted on a second carrier; combining all frequency component inputs to one output signal by performing an inverse fast Fourier transform of all frequency component inputs and a parallel to serial conversion; and providing the output signal on the output for transmission to a point-to-point receiver over a point-to-point medium.

The frequency component inputs for the first set of data subcarriers may be adjacent to the frequency component inputs for the second set of data subcarriers.

The step of receiving a second set of data subcarriers may comprise receiving the second set of data subcarriers at least partly on frequency component inputs for which power would need to be suppressed to provide a guard band when the output signal would be transmitted over the air.

The steps of receiving a first set of data subcarriers and receiving a second set of data subcarriers may be performed in parallel.

The method may further comprise the step of: receiving zero signals on frequency component inputs which are neither used for the first set of data subcarriers nor for the second set of data subcarriers, to fill up the number of frequency component inputs being equal to two to the power of an integer.

The first set of data subcarriers may form part of a transmission signal in accordance with Long Term Evolution, LTE and the second set of data subcarriers form part of a transmission signal in accordance with LTE.

According to a second aspect, it is provided a point-to-point transmitter comprising: a plurality of frequency component inputs; a transmitter output; a processor; and a memory storing instructions that, when executed by the processor, cause the point-to-point transmitter to: receive a first set of data subcarriers for a first signal stream on respective frequency component inputs, the first signal stream intended to be transmitted on a first carrier; receive a second set of data subcarriers for a second signal stream on respective frequency component inputs, the second signal stream intended to be transmitted on a second carrier; combine all frequency component inputs to one output signal by performing an inverse fast Fourier transform of all frequency component inputs and a parallel to serial conversion; and provide the output signal on the output for transmission to a point-to-point receiver over a point-to-point medium.

The frequency component inputs for the first set of data subcarriers may be adjacent to the frequency component inputs for the second set of data subcarriers.

The instructions to receive a second set of data subcarriers may comprise instructions that, when executed by the processor, cause the point-to-point transmitter to receive the second set of data subcarriers at least partly on frequency component inputs for which power needs to be suppressed to provide a guard band.

The instructions to receive a first set of data subcarriers and the instructions to receive a first set of data subcarriers may be executed in parallel.

The point-to-point transmitter may further comprise instructions that, when executed by the processor, cause the point-to-point transmitter to: receive zero signals on frequency component inputs which are neither used for the first set of data subcarriers nor for the second set of data subcarriers, to fill up the number of frequency component inputs being equal to two to the power of an integer.

The first set of data subcarriers may form part of a transmission signal in accordance with Long Term Evolution, LTE and the second set of data subcarriers may form part of a transmission signal in accordance with LTE.

According to a third aspect, it is provided a point-to-point transmitter comprising: means for receiving a first set of data subcarriers for a first signal stream on respective frequency component inputs, the first signal stream intended to be transmitted on a first carrier; means for receiving a second set of data subcarriers for a second signal stream on respective frequency component inputs, the second signal stream intended to be transmitted on a second carrier; means for combining all frequency component inputs to one output signal by performing an inverse fast Fourier transform of all frequency component inputs and a parallel to serial conversion; and means for providing the output signal on the output for transmission to a point-to-point receiver over a point-to-point medium.

According to a fourth aspect, it is provided a computer program for combining signal streams in a point-to-point transmitter comprising a plurality of frequency component inputs and a transmitter output. The computer program comprises computer program code which, when run on a point-to-point transmitter cause the point-to-point transmitter to: receive a first set of data subcarriers for a first signal stream on respective frequency component inputs, the first signal stream intended to be transmitted on a first carrier; receive a second set of data subcarriers for a second signal stream on respective frequency component inputs, the second signal stream intended to be transmitted on a second carrier; combine all frequency component inputs to one output signal by performing an inverse fast Fourier transform of all frequency component inputs and a parallel to serial conversion; and provide the output signal on the output for transmission to a point-to-point receiver over a point-to-point medium.

According to a fifth aspect, it is provided a computer program product comprising a computer program according to the fourth aspect and a computer readable means on which the computer program is stored.

According to a sixth aspect, it is provided a method for extracting signal streams in a point-to-point receiver comprising a receiver input. The method is performed in the point-to-point receiver and comprises the steps of: receiving one input signal on the input, the input signal having been transferred from a point-to-point transmitter over a point-to-point medium; separating frequency components of the input signal to a plurality of data subcarriers for respective frequency components by performing a serial to parallel conversion and a fast Fourier transform; combining a first set of the data subcarriers for transmission on a first carrier by performing a first inverse fast Fourier transform and a parallel to serial conversion; and combining a second set of data subcarriers for transmission on a second carrier by performing a second inverse fast Fourier transform and a parallel to serial conversion.

The data subcarriers of the first set may be adjacent to the data subcarriers of the second set.

The steps of combining the first set of the data subcarriers and the step of combining the second set of data subcarriers may be performed in parallel.

The first set of data subcarriers may form part of a transmission signal in accordance with Long Term Evolution, LTE and the second set of data subcarriers may form part of a transmission signal in accordance with LTE.

According to a seventh aspect, it is provided a point-to-point receiver comprising: a receiver input; a processor; and a memory storing instructions that, when executed by the processor, cause the point-to-point receiver to: receive one input signal on the input, the input signal having been transferred from a point-to-point transmitter over a point-to-point medium; separate frequency components of the input signal to a plurality of data subcarriers for respective frequency components by performing a serial to parallel conversion and a fast Fourier transform; combine a first set of the data subcarriers for transmission on a first carrier by performing a first inverse fast Fourier transform and a parallel to serial conversion; and combine a second set of data subcarriers for transmission on a second carrier by performing a second inverse fast Fourier transform and a parallel to serial conversion.

The data subcarriers of the first set may be adjacent to the data subcarriers of the second set.

The instructions to combine the first set of the data subcarriers and the instructions to combine the second set of data subcarriers may be performed in parallel.

The first set of data subcarriers may form part of a transmission signal in accordance with Long Term Evolution, LTE and the second set of data subcarriers may form part of a transmission signal in accordance with LTE.

According to an eighth aspect, it is provided a point-to-point receiver comprising: means for receiving one input signal on the input, the input signal having been transferred from a point-to-point transmitter over a point-to-point medium; means for separating frequency components of the input signal to a plurality of data subcarriers for respective frequency components by performing a serial to parallel conversion and a fast Fourier transform; means for combining a first set of the data subcarriers for transmission on a first carrier by performing a first inverse fast Fourier transform and a parallel to serial conversion; and means for combining a second set of data subcarriers for transmission on a second carrier by performing a second inverse fast Fourier transform and a parallel to serial conversion.

According to a ninth aspect, it is provided a computer program for extracting signal streams in a point-to-point receiver comprising a receiver input. The computer program comprises computer program code which, when run on the point-to-point receiver cause the point-to-point receiver to: receive one input signal on the input, the input signal having been transferred from a point-to-point transmitter over a point-to-point medium; separate frequency components of the input signal to a plurality of data subcarriers for respective frequency components by performing a serial to parallel conversion and a fast Fourier transform; combine a first set of the data subcarriers for transmission on a first carrier by performing a first inverse fast Fourier transform and a parallel to serial conversion; and combine a second set of data subcarriers for transmission on a second carrier by performing a second inverse fast Fourier transform and a parallel to serial conversion.

According to a tenth aspect, it is provided a computer program product comprising a computer program according to the ninth aspect and a computer readable means on which the computer program is stored.

According to an eleventh aspect, it is provided a system for point-to-point communication comprising a point-to-point transmitter and a point-to-point receiver. The point-to-point transmitter comprises: a plurality of frequency component inputs; a transmitter output; a processor; and a memory storing instructions that, when executed by the processor, cause the point-to-point transmitter to: receive a first set of data subcarriers for a first signal stream on respective frequency component inputs, the first signal stream intended to be transmitted on a first carrier; receive a second set of data subcarriers for a second signal stream on respective frequency component inputs, the second signal stream intended to be transmitted on a second carrier; combine all frequency component inputs to one output signal by performing an inverse fast Fourier transform of all frequency component input and a parallel to serial conversion; and provide the output signal on the output for transmission to the point-to-point receiver over a point-to-point medium. The point-to-point receiver comprises: a receiver input; a processor; and a memory storing instructions that, when executed by the processor, cause the point-to-point receiver to: receive one input signal on the input, the input signal having been transferred from the point-to-point transmitter over the point-to-point medium; separate frequency components of the input signal to a plurality of data subcarriers for respective frequency components by performing a serial to parallel conversion and a fast Fourier transform; combine a first set of the data subcarriers for transmission on a first carrier by performing a first inverse fast Fourier transform and a parallel to serial conversion; and combine a second set of data subcarriers for transmission on a second carrier by performing a second inverse fast Fourier transform and a parallel to serial conversion.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
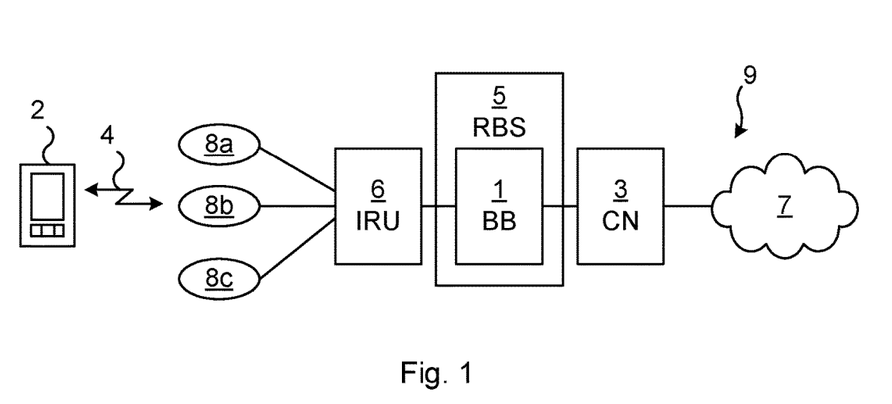
FIG. 1 is a schematic architecture diagram illustrating an environment where embodiments presented herein can be applied.

FIG. 1 is a schematic architecture diagram illustrating an environment where embodiments presented herein can be applied. A cellular communication network 9 comprises a number of remote radio heads (RRHs) 8a-c for installation in locations where traditional deployment with antennas being co-located with the radio base stations is not ideal, e.g. to increase coverage and reduce handovers in areas with a large concentration of subscribers, such as in office buildings, shopping centres, train stations, airports, arenas, etc.

It is to be noted that, while the embodiments presented herein are described as implemented using LTE (Long Term Evolution) and/or W-CDMA (Wideband Code Division Access), any applicable communication standard may be used, such as any one or a combination of LTE-SAE (Long Term Evolution System Architecture Evolution), GSM (Global System for Mobile communication), EDGE (Enhanced Data Rates for GSM Evolution), GPRS (General Packet Radio Service), CDMA2000 (Code Division Multiple Access 2000), or any other current or future wireless network, such as LTE-Advanced, as long as the principles described hereinafter are applicable.

A radio base station (RBS) 5 here comprises one or more baseband modules (BB) 1. The baseband modules BB can be handled by digital units (DUs) in the RBS 5, where each DU can handle one or more BB modules 1. A combiner 6 is used in the uplink to combine uplink signals from a plurality of remote radio heads 8a-c and forward data to the baseband module 1. The combiner 6 is connected to each one of the remote radio heads 8a-c via a point-to-point link. The point-to-point link is not a cellular link and does not need to comply with requirements for cellular communication, even if the link may transfer data for a cellular network.

In downlink, the combiner 6 may function as a splitter, providing downlink signals from the baseband module 1 to each one of the connected remote radio heads 8a-c. The combiner 6 is also known as an indoor radio unit (IRU). It is to be noted though that the combiner may also be provided outdoors whenever appropriate. The combiner 6 is in this way a link for a number (in this example three) of remote radio heads 8a-c. In this way, the radio base station 5 is a link for uplink and downlink communication for the remote radio heads connected to the combiner 6. One function of the radio base station 5 is to function as a digital unit (DU), using the one or more baseband modules 1, for processing uplink and downlink signals in the digital domain. It is to be noted that the combiner 6 may be provided separately from the radio base station 5 (as shown), or integrated within the radio base station (not shown).

The radio base station 5 is also connected to a core network 3. The core network 3 provides central functions and connectivity to external networks 7 such as the Internet and other cellular communication networks.

The remote radio heads 8a-c connected to the combiner 6 can be part of a single radio cell or they can form part of two or more different cells. Antennas do not need to be included in this embodiment of the radio base station 5 or the combiner 6, as the remote radio heads 8a-c provide the antennas for the wireless link 4 to one or more wireless devices 2. The wireless link 4 provided by the remote radio heads 8a-c includes both downlink (DL) communication to the wireless devices 2 and uplink (UL) communication from the wireless devices 2. The term wireless device is also known as mobile communication terminal, user equipment (wireless device), station (STA), mobile terminal, user terminal, user agent, machine-to-machine devices etc., and can be, for example, what today is commonly known as a mobile phone or a tablet/laptop with wireless connectivity or fixed mounted terminal.

In radio communication systems, the data is transmitted and received over the air at a specific radio frequency either the same for transmission and reception or on separate frequencies. This is often called the radio frequency (RF) or the carrier frequency.

There are many different carrier frequencies, depending on regional spectrum allocation and spectrum license rights. To create a common radio implementation supporting this variety of carrier frequencies, a second set of frequencies is used herein, denoted the Intermediate Frequency (IF), which is used for communication on the cables between the combiner 6 and the remote radio heads 8a-c.

It is to be noted that the processing of uplink and downlink signals in the combiner and the remote radio heads 8a-c do not need to occur in the digital domain and can be (but do not need to be) performed completely in the analogue domain.

The remote radio heads 8a-c convert from IF to RF for downlink transmission and from RF to IF for uplink reception. Conversely, the combiner 6 converts from digital BB to IF for downlink transmission and from IF to digital BB for uplink reception.

By using IF instead of RF over the cables between the combiner 6 and the remote radio heads 8a-c, cheaper, widely deployed electrical cables can be used, such as Ethernet LAN cabling. In this way, existing indoor cabling can many times be reused during installation, which significantly saves cost, installation time and complexity. Optionally, the remote radio heads 8a-c are also powered over the respective cables.

The transmission and reception is under the control of the MAC (Media Access Control) scheduler in the baseband module 1. The MAC scheduler informs what transmissions should be made and informs, via the downlink signaling, the wireless devices when to transmit and on which frequency and power.

The link between the combiner 6 and the baseband module 1 utilises a digital signal interface, such as CPRI (Common Public Radio Interface) or gigabit Ethernet. The link between the combiner and the baseband module 1 is also a point-to-point link and does not need to comply with cellular communication standards.

It is to be noted that, although FIG. 1 shows the baseband module 1 connected to one combiner 6, each baseband module 1 can be connected to several combiners over separate respective links. It is also possible that several baseband modules 1 are connected to one combiner 6.

It is to be noted that while the embodiment of FIG. 1 shows three remote radio heads 8a-8c, there may be fewer or more remote radio heads connected to each combiner 6.

In the environment of FIG. 1, control data can be signalled between the baseband module 1 and the combiner 6, between the combiner 6 and the remote radio heads 8a-c and/or between the remote radio heads and the baseband module 1. The signalling of the control data can occur in the downlink (in a direction towards the wireless device 2) or in the uplink (in a direction towards the core network 3). It is to be noted that this control data can be separate from control data defined in the standards documentation (e.g. for LTE) and its structure can be freely designed as part of the implementation of embodiments presented herein. The control data can e.g. relate to configuration of the remote radio heads, measurements from the remote radio heads, frequency configuration for payload data over the IF interface, fault monitoring, etc.

As explained in more detail below, in a point-to-point communication link as utilised here, several signal streams can be combined more efficiently than what is done in the prior art by exploiting the fact that the point-to-point communication link does not need to comply with cellular standards.

Figure 2:
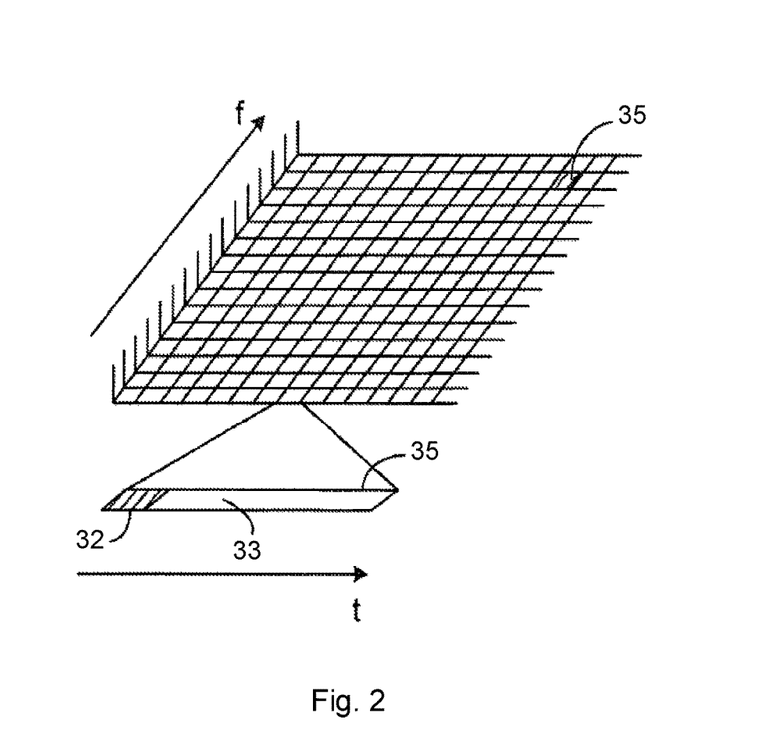
FIG. 2 is a schematic diagram illustrating the physical resources for downlink communication in LTE.

FIG. 2 is a schematic diagram illustrating the physical resources for downlink communication in LTE (Long Term Evolution). Downlink communication is communication from a network node to a wireless device. LTE uses OFDM (Orthogonal Frequency Division Multiplexing) in the downlink and DFT (Discrete Fourier Transform)-spread OFDM in the uplink. The basic LTE downlink physical resource can thus be seen as a time-frequency grid as illustrated in FIG. 2, where each resource element 35 corresponds to one OFDM subcarrier during one OFDM symbol interval. Each resource element 35 comprises cyclic prefix section 32 and a main section 33. The purpose of the cyclic prefix section 32 is to allow reception even when there is time dispersion of the signal, e.g. due to multipath.

Figure 3:
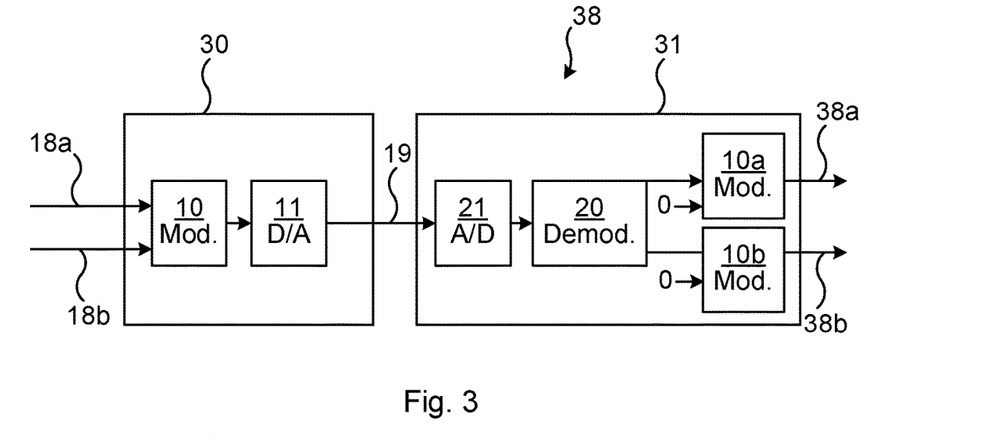
FIG. 3 is a schematic diagram of a system illustrating a transmitter and a receiver over a point-to-point medium according to one embodiment.

FIG. 3 is a schematic diagram of a system 38 illustrating transmitter and a receiver over a point-to-point medium according to one embodiment.

A transmitter 30 and a receiver 31 are connected over a point-to-point medium 19. It is to be noted that the transmitter 30 and the receiver 31 are defined here as such in relation to the point-to-point medium 19. In other words, the transmitter 30 can also be a receiver for other links and the receiver 31 can be a transmitter for other links.

The point-to-point medium 19 is used for communication between only two entities and can e.g. be a CPRI link between the baseband module 1 and the combiner 6 of FIG. 1 and/or an IF link over Ethernet between the combiner 6 and one or more of the remote radio heads 8a-c of FIG. 1. Alternatively or additionally, the link can be a link between the baseband module 1 and one or more of the remote radio heads 8a-c of FIG. 1. The point-to-point medium 19 has a direction of communication from the transmitter 30 to the receiver 31 as indicated by the arrow and can be used for uplink or downlink. Optionally, two separate links are used to provide both uplink and downlink communication. Hence, the transmitter 30 can e.g. be the baseband module 1, the combiner 6 or one or more of the remote radio heads. Analogously, the receiver 31 can e.g. be the baseband module 1, the combiner 6 or one or more of the remote radio heads, as long as there is a point-to-point medium to the transmitter 30. Specifically, the point-to-point medium 19 is not a link between a radio base station and a wireless device. In this way, redundant resources which are normally assigned to the radio interface can be utilised here for combining several signal streams. Such redundant data can e.g. normally be (i.e. when prepared for radio transmissions) zero signals on zero subcarriers which reduce filter requirements and the leakage between frequency bands. In other words, several signal streams can be frequency multiplexed with great efficiency when transferred over the point-to-point medium 19. The signal streams are later extracted as described below and provided to separate antenna ports for transmission over the air.

The transmitter 30 comprises a modulator 10 and optionally a Digital to Analogue (D/A) converter 11 when the point-to-point medium 19 is an analogue communication link such as IF. When the point-to-point medium 19 is a digital communication link, such as CPRI, then the D/A converter 11 is not needed. A first input 18a comprises a first set of frequency component inputs for a first signal stream intended to be transmitted on a first carrier. A second input 18b comprises a second set of frequency component inputs for a second signal stream intended to be transmitted on a second carrier. The number of frequency components used for the first input 18a and the second input 18b do not need to be, but can be, equal. The data provided on the inputs 18 is synchronised in terms of the start and the end of an OFDM symbol.

Optionally, the receiver 31 comprises an Analogue to Digital (A/D) converter 21 which converts the signal received over the point-to-point medium 19 to digital representation, when the point-to-point medium is an analogue communication link such as IF. When the point-to-point medium 19 is a digital communication link, such as CPRI, then the A/D converter 21 is not needed. A demodulator 20 separates frequency components for the first stream and the second stream. The frequency components for the first stream are provided to a first receiver modulator b0a and the frequency components for the second stream are provided to a second receiver modulator b0b.

The first receiver modulator b0a combines a first set of the data subcarriers for transmission on a first carrier by performing a first inverse fast Fourier transform and a parallel to serial conversion. Zero components are provided on the frequency component inputs of the first receiver modulator b0a which are not occupied by the frequency components of the first signal stream. A first signal stream output 38a is provided for transmission on a first carrier.

The second receiver modulator 10b combines a second set of the data subcarriers for transmission on a second carrier by performing a second inverse fast Fourier transform and a parallel to serial conversion. Zero components are provided on the frequency component inputs of the second receiver modulator 10b which are not occupied by the frequency components of the second signal stream. A second signal stream output 38b is provided for transmission on a second carrier.

The first carrier and second carriers are associated with different transmission ports. For instance, the carrier frequencies may differ for the first carrier and the second carriers. Alternatively or additionally different MIMO (Multiple Input Multiple Output) ports can be used for the two carriers.

Both the first signal stream output 38a and the second signal stream output 38b are in a format which is suitable for transmission over the air and comply with the radio interface used, e.g. LTE or W-CDMA.

In the uplink, single-carrier frequency-division multiple-access (SC-FDMA) is used in LTE. The embodiment described above is readily applicable to SC-FDMA by performing a frequency domain equalization and transforming the received signal back to the time domain. Frequency domain equalization is performed in any LTE uplink receiver and therefore does not dictate a new requirement.

Figure 4A:
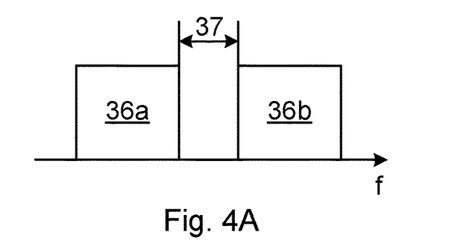
FIGS. 4A-B are schematic graphs illustrating frequency multiplexing of signal streams.
Figure 4B:
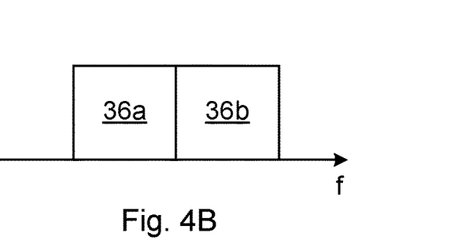

FIGS. 4A-B are schematic graphs illustrating frequency multiplexing of signal streams. Looking first to FIG. 4A, this illustrates frequency multiplexing of signal streams in the prior art. Here, a first signal stream 36a (e.g. an LTE signal stream) is provided with a guard band 37 from a second signal stream 36b to prevent leakage between the two signal streams. The guard band 37 is required in order to avoid leakage between the signal streams 36a-b.

However, by providing the signal streams to the same modulator 10 as explained above, the point-to-point transmitter 30 combines the frequency components of both signal streams to one output signal by performing an inverse fast Fourier transform of all frequency component inputs and a parallel to serial conversion. In this way, the signal streams can be frequency multiplexed adjacent to each other, as seen in FIG. 4B, without the need for any guard band between the frequency components of the signal streams This approach would not work over the air since in such a case, the guard band is needed for the receiver to be able to prevent leakage between the signal streams. However, in this particular circumstance, when transmitted over the point-to-point medium rather than over the air, we can achieve better efficiency both in frequency utilisation and hardware utilisation.

Figure 5:
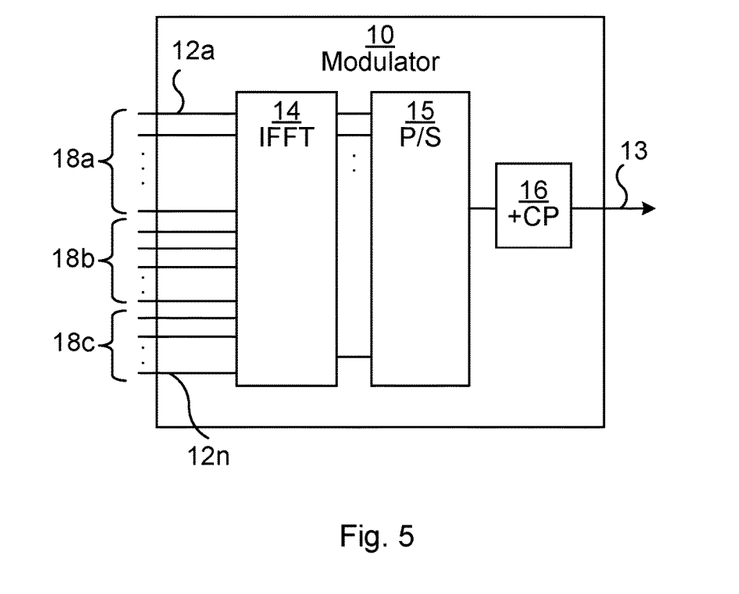
FIG. 5 is a schematic diagram illustrating a modulator of FIG. 3 according to one embodiment.

FIG. 5 is a schematic diagram illustrating a modulator 10 of FIG. 3 according to one embodiment. The modulator 10 comprises an inverse fast Fourier transform (IFFT) module 14, a parallel to serial converter 15 and a cyclic prefix (CP) generator 16.

The modulator 10 has a number (n) of frequency component inputs 12a-n which are fed to the IFFT module 14. The inputs to the modulator 10 are here separated in three inputs 18a-c. The first input 18a contains frequency component inputs (subcarriers) which relate to the first signal stream intended to be transmitted on a first carrier. On each frequency component input of the first input 18a, one transmit symbol is provided at a time. Together, all transmit symbols provided on the component inputs of the first input 18a constitute one OFDM symbol.

The second input 18b contains frequency component inputs (subcarriers) which relate to the second signal stream intended to be transmitted on a first carrier. On each frequency component input of the second input 18b, one transmit symbol is provided at a time. Together, all transmit symbols provided on the component inputs of the second input 18b constitute one OFDM symbol.

A third input 18c contains frequency component inputs (subcarriers) which are zero, i.e. zero subcarriers. The zero subcarriers are used to allow a feasible time-domain reconstruction filter. Without the zero subcarriers there would be no oversampling and, a perfect analogue brick-wall filter would be required after the D/A converter 11 in order to remove images from higher Nyqvist zones while keeping the modulated subcarriers intact. Since it is not possible to implement brick-wall filters in practice, zero tones are added and serve the purpose of oversampling the signal. More zero tones means that the steepness requirements of the reconstruction filter are reduced.

Moreover, the zero subcarriers are used to fill up remaining sub-carriers to get an IFFT size that is two to the power of an integer (more computationally efficient), as explained below. Another benefit of the zero subcarriers is that they can act as a guard band between OFDM carriers when the signal is transmitted over the air.

However, when the modulator and demodulator communicate via a point-to-point medium 19, part of the subcarriers assigned to be zero subcarriers for the wireless interface can be utilised for other purposes. Specifically, these subcarriers here form the second input 18b and are thus used for the second signal stream when the point-to-point medium 19 is not a wireless interface between a radio base station and a wireless device.

The subcarriers of the second input 18b need to be known by both the transmitter 30 and the receiver 31. This can be pre-configured in both ends or signalled using a control channel.

The IFFT module 14 operates to convert the frequency component inputs to time domain samples, which are samples being complex numbers. When the number of frequency component inputs is equal to two to the power of an integer, the IFFT module 14 can be implemented with great efficiency. Hence, the IFFT module 14 is typically implemented with the number of inputs being a number which is two to the power of an integer which has at least as many frequency component inputs that are provided to the modulator 10 in the first input 18a, i.e. the first signal stream. For instance, LTE with 10 MHz bandwidth has 600 subcarriers for the first signal stream, so the closest two to the power of an integer that is larger than 600 is 1024 ($2^{10}$). This leaves 1024−600=424 subcarriers which can be split between the second input 18b and the third input 18c. To be complete, there is one additional direct current (DC) subcarrier in the downlink, which then reduces the number of zero subcarriers to 423 for the downlink. In the prior art, all of the 424 spare subcarriers are fed with zero subcarriers, i.e. the second input 18b is empty.

The time domain symbols are provided by the IFFT module 14 to the parallel to serial converter 15 which serialises the time domain symbols to one stream of symbols, which are fed to the CP generator 16. The CP generator 16 generates CP symbols 13, which are copies of a subset of the serialised symbols which form part of the main section. Specifically, the CP is generated by copying the last ncp symbols of the main section and adding the symbols to the beginning of the output from the parallel to serial converter 15.

It is to be noted that the number of subcarriers of the second input 18b is selected such that the third input 18c comprises certain number of zero subcarriers to provide a sufficient level of oversampling. This ensures that a D/A conversion of the time domain OFDM signal with realizable filters is possible The third input 18c, comprising the zero subcarriers, is placed at the first or last subcarriers of the IFFT.

Figure 6:
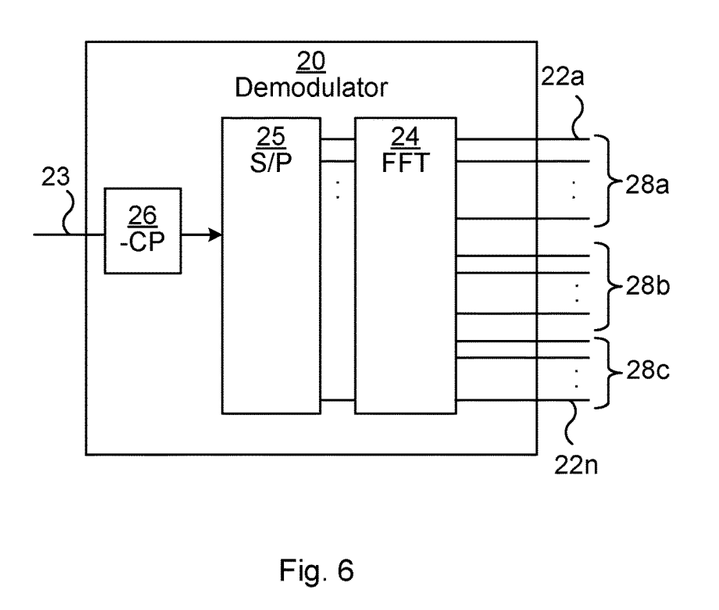
FIG. 6 is a schematic diagram illustrating a demodulator of FIG. 3 according to one embodiment.

FIG. 6 is a schematic diagram illustrating a demodulator of FIG. 3 according to one embodiment. The demodulator 20 corresponds to the modulator 10, but in reverse.

Hence, the demodulator 20 comprises a cyclic prefix (CP) remover 26, a serial to parallel converter 25 and a fast Fourier transform (FFT) module 24.

The demodulator 20 has one demodulator input 23 and a number of frequency component outputs 22a-n supplied by the FFT module 24. In analogy with the modulator 10, the n outputs 22a-n of the demodulator 20 can be provided on three outputs 28a-c. A first output 28a contains frequency components which relate to the first signal stream. A second output 28b contains frequency components which relate to the second signal stream. A third output 28c contains frequency components which are zero, i.e. zero data.

Looking now to the signal flow through the demodulator 20, the CP remover 26 receives the signal on the demodulator input and removes CP samples 32 of each received element. As long as the reception occurred successfully, this removal can be safely done since the CP only contains copies of serialised samples which form part of the main section.

The main section of the samples (without CP) are then provided to the serial to parallel converter 25 which distributes the samples on a plurality of parallel channels to the FFT module 24.

The FFT module 24 operates to convert the time domain samples to frequency component outputs, i.e. subcarriers. In analogy with the IFFT module 14, when the number of frequency component outputs is equal to two to the power of an integer, the FFT module 24 can be implemented with great efficiency. Hence, the FFT module 24 is typically implemented with the number of inputs being a number which is two to the power of an integer which has at least as many frequency component outputs that are provided from the demodulator 20 in the first output 28a, i.e. outputs for the first signal stream.

Figure 7A:
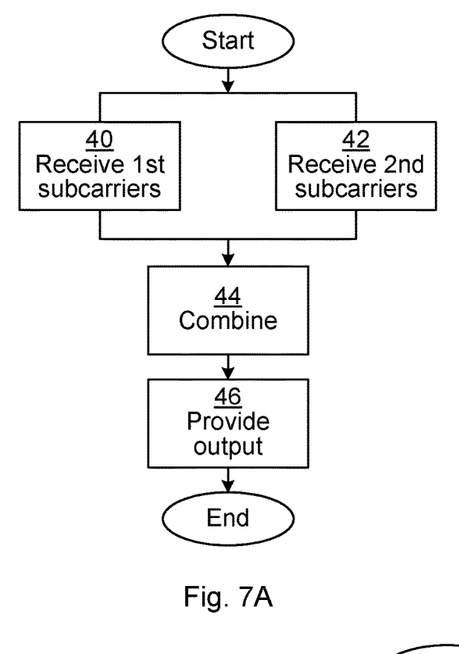
FIGS. 7A-B are flow charts illustrating embodiments of methods for combining signal streams in the transmitter of FIG. 3.
Figure 7B:
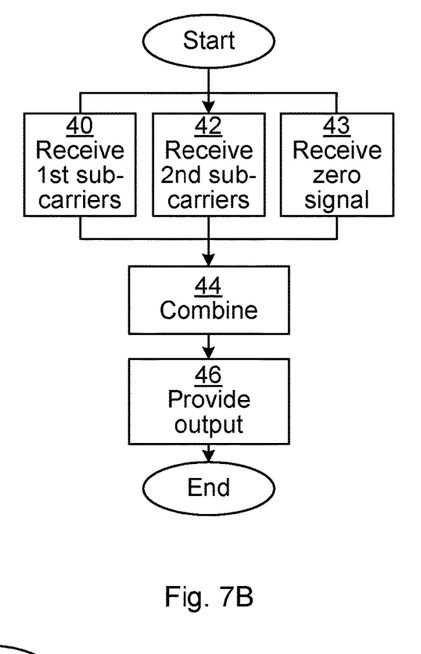

FIGS. 7A-B are flow charts illustrating embodiments of methods for combining signal streams in the transmitter of FIG. 3.

In a receive $1^{st}$ subcarriers step 40, a first set of data subcarriers for a first signal stream is received on respective frequency component inputs. The first signal stream is intended to be transmitted on a first carrier.

In a receive $2^{nd}$ subcarriers step 42, a second set of data subcarriers for a second signal stream is received on respective frequency component inputs. The second signal stream is intended to be transmitted on a second carrier.

The frequency component inputs for the first set of data subcarriers can be provided adjacent to the frequency component inputs for the second set of data subcarriers. In this way, efficiency is increased and any space left over can be used for zero carriers (see step 43 below).

The second set of data subcarriers are received at least partly on frequency component inputs for which power would need to be suppressed to provide a guard band when the output signal would be transmitted over the air.

The receive $1^{st}$ subcarrier step 40 and the receive $2^{nd}$ subcarrier step 42 are performed in parallel to allow the modulator of the transmitter to concurrently process all inputs in the IFFT module.

The first set of data subcarriers form part of a transmission signal in accordance with LTE and the second set of data subcarriers form part of a transmission signal in accordance with LTE. However, the combination is not compliant with LTE, since there is no or only little guard band provided between the first and second set of data subcarriers.

In a combine step 44, all frequency component inputs are combined to one output signal by performing an IFFT of all frequency component inputs and a parallel to serial conversion.

In a provide output step 46, the output signal is provided on the output for transmission to a point-to-point receiver over a point-to-point medium.

Looking now to FIG. 7B, only new or modified steps compared to the method illustrated by the flow chart of FIG. 7A will be described.

In a receive zero signal step 43, zero signals are received on frequency component inputs which are neither used for the first set of data subcarriers nor for the second set of data subcarriers. This is done to fill up the number of frequency component inputs to be equal to two to the power of an integer.

Figure 8:
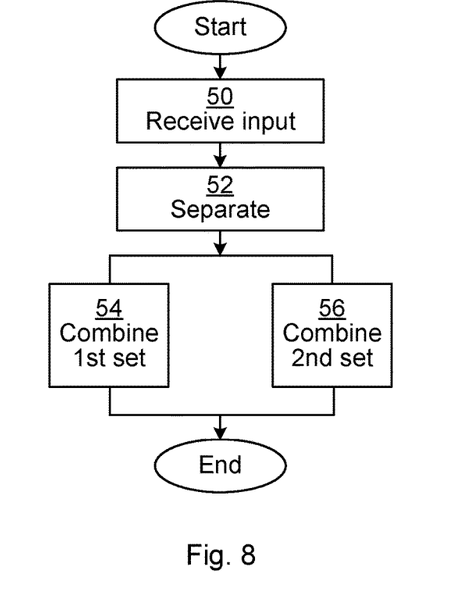
FIG. 8 is a flow chart illustrating embodiments of a method for extracting signal streams performed in the receiver of FIG. 3.

FIG. 8 is a flow chart illustrating embodiments of a method for extracting signal streams performed in the receiver of FIG. 3.

In a receive input step 50, one input signal is received on the input. The input signal has been transferred from a point-to-point transmitter over a point-to-point medium.

In a separate step 52, frequency components of the input signal are separated to a plurality of data subcarriers for respective frequency components by performing a serial to parallel conversion and a fast Fourier transform. In the output from this step, the data subcarriers of the first set (for the first signal stream) can be provided adjacent to the data subcarriers of the second set (for the second signal stream).

In a combine $1^{st}$ set step 54, a first set of the data subcarriers is combined for transmission on a first carrier by performing a first inverse fast Fourier transform and a parallel to serial conversion. This step is performed in the first receiver modulator boa of the receiver 31.

In a combine $2^{nd}$ set step 56, a second set of data subcarriers is combined for transmission on a second carrier by performing a second inverse fast Fourier transform and a parallel to serial conversion. This step is performed in the second receiver modulator 10b of the receiver 31.

In the combine $1^{st}$ set step 54, the second set of data carriers is not part of the combining. Analogously, in the combine $2^{nd}$ set step 56, the first set of data carriers is not part of the combining. Instead, zero subcarriers are provided to fill up the inputs to the first receiver modulator boa and the second receiver modulator 10b, whereby the first set of data subcarriers and the second set of data subcarriers each provide sufficient guard band in form of zero subcarriers and form part of a transmission signal in accordance with the applicable standards, e.g. LTE, for the radio transmission.

The combine $1^{st}$ set step 54 and the combine $2^{nd}$ set step 56 can be performed in parallel.

It is to be noted that while the embodiments above describe the combining of two signal streams, the same principle can be used to combine three or more signal streams as long as there are sufficient frequency components inputs and outputs on the modulator and the demodulator.

Using the embodiments of methods described above, the signal streams can be combined with no guard band between in the form of zero subcarriers. This works since the point-to-point medium does not need to be a wireless medium and does not need to comply with radio standards for cellular networks. This allows a single modulator and a single demodulator to handle several signal streams. In this way, resources are utilised more efficiently in the point-to-point transmitter, the point-to-point receiver and the point-to-point medium.

Figure 9:
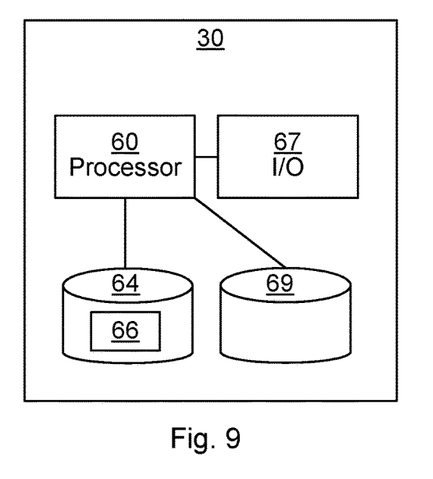
FIG. 9 is a schematic diagram showing some components of an embodiment of the transmitter of FIG. 3 according to one embodiment.

FIG. 9 is a schematic diagram showing some components of an embodiment of the transmitter of FIG. 3. A processor 60 is provided using any combination of one or more of a suitable central processing unit (CPU), multiprocessor, microcontroller, digital signal processor (DSP), application specific integrated circuit etc., capable of executing software instructions 66 stored in a memory 64, which can thus be a computer program product. The processor 60 can be configured to execute the method described with reference to FIGS. 7A-B above.

The memory 64 can be any combination of random access memory (RAM) and read only memory (ROM). The memory 64 also comprises persistent storage, which, for example, can be any single one or combination of magnetic memory, optical memory, solid state memory or even remotely mounted memory.

A data memory 69 is also provided for reading and/or storing data during execution of software instructions in the processor 60. The data memory 69 can be any combination of random access memory (RAM) and read only memory (ROM).

The transmitter further comprises an I/O interface 67 for communicating with other external entities, e.g. over a point-to-point interface to a receiver. Optionally, the I/O interface 67 also includes a user interface.

Figure 10:
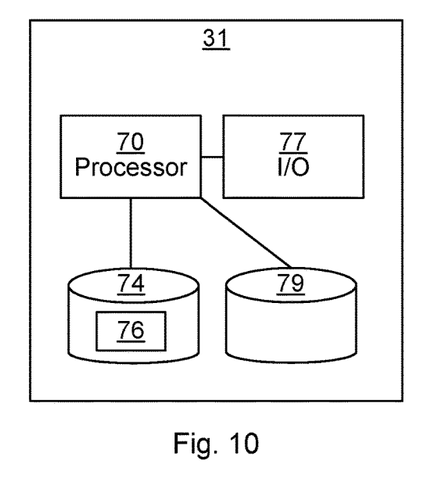
FIG. 10 is a schematic diagram showing some components of an embodiment of the receiver of FIG. 3 according to one embodiment.

FIG. 10 is a schematic diagram showing some components of an embodiment of the receiver of FIG. 3. A processor 70 is provided using any combination of one or more of a suitable central processing unit (CPU), multiprocessor, microcontroller, digital signal processor (DSP), application specific integrated circuit etc., capable of executing software instructions 76 stored in a memory 74, which can thus be a computer program product. The processor 70 can be configured to execute the method described with reference to FIG. 8 above.

The memory 74 can be any combination of random access memory (RAM) and read only memory (ROM). The memory 74 also comprises persistent storage, which, for example, can be any single one or combination of magnetic memory, optical memory, solid state memory or even remotely mounted memory.

A data memory 79 is also provided for reading and/or storing data during execution of software instructions in the processor 70. The data memory 79 can be any combination of random access memory (RAM) and read only memory (ROM).

The receiver further comprises an I/O interface 77 for communicating with other external entities, e.g. over a point-to-point interface to a transmitter. Optionally, the I/O interface 77 also includes a user interface.

Figure 11:
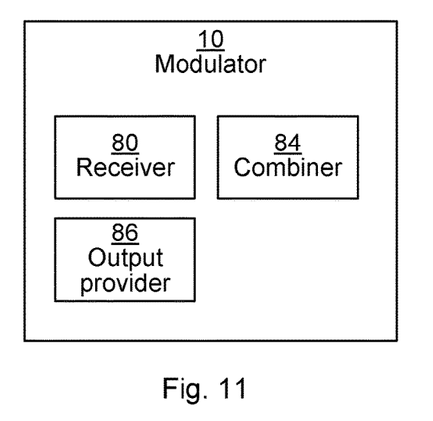
FIG. 11 is a schematic diagram showing functional modules of the software instructions of the transmitter of FIG. 3 or FIG. 9 according to one embodiment.

FIG. 11 is a schematic diagram showing functional modules of the software instructions of the transmitter of FIG. 3 or FIG. 9 according to one embodiment. The modules are implemented using software instructions such as a computer program executing in the transmitter. The modules correspond to the steps in the methods illustrated in FIGS. 7A-B.

A receiver 80 corresponds to steps 40, 42 and 43. A combiner 84 corresponds to step 44. An output provider 86 corresponds to step 46.

Figure 12:
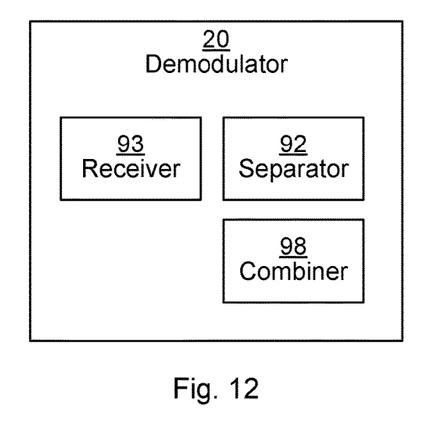
FIG. 12 is a schematic diagram showing functional modules of the software instructions of the receiver of FIG. 3 or FIG. 10 according to one embodiment.

FIG. 12 is a schematic diagram showing functional modules of the software instructions of the receiver of FIG. 3 or FIG. 10 according to one embodiment. The modules are implemented using software instructions such as a computer program executing in the receiver. The modules correspond to the steps in the methods illustrated in FIGS. 8A-B.

A receiver 93 corresponds to step 50. A separator 92 corresponds to step 52. A combiner 98 corresponds to steps 54 and 56.

Figure 13:
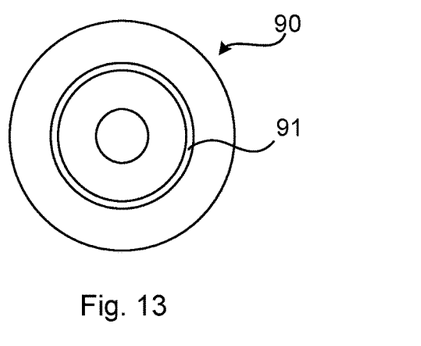
FIG. 13 shows one example of a computer program product comprising computer readable means.

FIG. 13 shows one example of a computer program product comprising computer readable means. On this computer readable means a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 64 of FIG. 9 or the computer program product 74 of FIG. 10. While the computer program 91 is here schematically shown as a track on the depicted optical disk, the computer program can be stored in any way which is suitable for the computer program product, such as a removable solid state memory, e.g. a Universal Serial Bus (USB) drive.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for combining signal streams in a point-to-point transmitter comprising a plurality of frequency component inputs and a transmitter output, the method being performed in the point-to-point transmitter and comprising the steps of:

receiving a first set of data subcarriers for a first signal stream on respective frequency component inputs, the first signal stream intended to be transmitted on a first carrier;

receiving a second set of data subcarriers for a second signal stream on respective frequency component inputs, the second signal stream intended to be transmitted on a second carrier;

combining all frequency component inputs to one output signal by performing an inverse fast Fourier transform of all frequency component inputs and a parallel to serial conversion; and providing the output signal on the output for transmission to a point-to-point receiver over a point-to-point medium, wherein the point-to-point medium is not a link between a radio base station and a wireless device.

2. The method according to claim 1, wherein the frequency component inputs for the first set of data subcarriers are adjacent to the frequency component inputs for the second set of data subcarriers.

3. The method according to claim 1, wherein the step of receiving a second set of data subcarriers comprises receiving the second set of data subcarriers at least partly on frequency component inputs for which power would need to be suppressed to provide a guard band when the output signal would be transmitted over the air.

4. The method according to claim 1, wherein the steps of receiving a first set of data subcarriers and receiving a second set of data subcarriers are performed in parallel.

5. The method according to claim 1, further comprising the step of:
   receiving signals comprising zero data on frequency component inputs which are neither used for the first set of data subcarriers nor for the second set of data subcarriers, to fill up the number of frequency component inputs being equal to two to the power of an integer.

6. The method according to claim 1, wherein the first set of data subcarriers form part of a transmission signal in accordance with Long Term Evolution, LTE and the second set of data subcarriers form part of a transmission signal in accordance with LTE.

7. The method of claim 1, wherein the point-to-point medium is one of:
   a link between a baseband module and a combiner;
   a link between a combiner and one or more remote radio heads; and
   a link between a baseband module and one or more remote radio heads.

8. A point-to-point transmitter comprising:
   a plurality of frequency component inputs;
   a transmitter output;
   a processor; and
   a memory storing instructions that, when executed by the processor, cause the point-to-point transmitter to:
   receive a first set of data subcarriers for a first signal stream on respective frequency component inputs, the first signal stream intended to be transmitted on a first carrier;
   receive a second set of data subcarriers for a second signal stream on respective frequency component inputs, the second signal stream intended to be transmitted on a second carrier;
   combine all frequency component inputs to one output signal by performing an inverse fast Fourier transform of all frequency component inputs and a parallel to serial conversion; and
   provide the output signal on the output for transmission to a point-to-point receiver over a point-to-point medium, wherein the point-to-point medium is not a link between a radio base station and a wireless device.

9. The point-to-point transmitter according to claim 8, wherein the frequency component inputs for the first set of data subcarriers are adjacent to the frequency component inputs for the second set of data subcarriers.

10. The point-to-point transmitter according to claim 8, wherein the instructions to receive a second set of data subcarriers comprise instructions that, when executed by the processor, cause the point-to-point transmitter to receive the second set of data subcarriers at least partly on frequency component inputs for which power needs to be suppressed to provide a guard band.

11. The point-to-point transmitter according to claim 8, wherein the instructions to receive a first set of data subcarriers and the instructions to receive a first set of data subcarriers are executed in parallel.

12. The point-to-point transmitter according to claim 8, further comprising instructions that, when executed by the processor, cause the point-to-point transmitter to:
   receive signals comprising zero data on frequency component inputs which are neither used for the first set of data subcarriers nor for the second set of data subcarriers, to fill up the number of frequency component inputs being equal to two to the power of an integer.

13. The point-to-point transmitter according to claim 8, wherein the first set of data subcarriers form part of a transmission signal in accordance with Long Term Evolution, LTE and the second set of data subcarriers form part of a transmission signal in accordance with LTE.

14. A point-to-point transmitter comprising:
   means for receiving a first set of data subcarriers for a first signal stream on respective frequency component inputs, the first signal stream intended to be transmitted on a first carrier;
   means for receiving a second set of data subcarriers for a second signal stream on respective frequency component inputs, the second signal stream intended to be transmitted on a second carrier;
   means for combining all frequency component inputs to one output signal by performing an inverse fast Fourier transform of all frequency component inputs and a parallel to serial conversion; and
   means for providing the output signal on the output for transmission to a point-to-point receiver over a point-to-point medium, wherein the point-to-point medium is not a link between a radio base station and a wireless device.

15. A non-transitory medium comprising a computer program for combining signal streams in a point-to-point transmitter comprising a plurality of frequency component inputs and a transmitter output, the computer program comprising computer program code which, when run on a point-to-point transmitter cause the point-to-point transmitter to:
   receive a first set of data subcarriers for a first signal stream on respective frequency component inputs, the first signal stream intended to be transmitted on a first carrier;
   receive a second set of data subcarriers for a second signal stream on respective frequency component inputs, the second signal stream intended to be transmitted on a second carrier;
   combine all frequency component inputs to one output signal by performing an inverse fast Fourier transform of all frequency component inputs and a parallel to serial conversion; and
   provide the output signal on the output for transmission to a point-to-point receiver over a point-to-point medium, wherein the point-to-point medium is not a link between a radio base station and a wireless device.

16. A method for extracting signal streams in a point-to-point receiver comprising a receiver input, the method being performed in the point-to-point receiver and comprising the steps of:
   receiving one input signal on the input, the input signal having been transferred from a point-to-point transmitter over a point-to-point medium, wherein the point-to-point medium is not a link between a radio base station and a wireless device;
   separating frequency components of the input signal to a plurality of data subcarriers for respective frequency components by performing a serial to parallel conversion and a fast Fourier transform;
combining a first set of the data subcarriers for transmission on a first carrier by performing a first inverse fast Fourier transform and a parallel to serial conversion; and
combining a second set of data subcarriers for transmission on a second carrier by performing a second inverse fast Fourier transform and a parallel to serial conversion.

17. The method according to claim 16, wherein the data subcarriers of the first set are adjacent to the data subcarriers of the second set.

18. The method according to claim 16, wherein the steps of combining the first set of the data subcarriers and the step of combining the second set of data subcarriers are performed in parallel.

19. The method according to claim 16, wherein the first set of data subcarriers form part of a transmission signal in accordance with Long Term Evolution, LTE and the second set of data subcarriers form part of a transmission signal in accordance with LTE.

20. The method of claim 16, wherein the point-to-point medium is one of:
a link between a baseband module and a combiner;
a link between a combiner and one or more remote radio heads; and
a link between a baseband module and one or more remote radio heads.

21. A point-to-point receiver comprising:
a receiver input;
a processor; and
a memory storing instructions that, when executed by the processor, cause the point-to-point receiver to:
receive one input signal on the input, the input signal having been transferred from a point-to-point transmitter over a point-to-point medium, wherein the point-to-point medium is not a link between a radio base station and a wireless device;
separate frequency components of the input signal to a plurality of data subcarriers for respective frequency components by performing a serial to parallel conversion and a fast Fourier transform;
combine a first set of the data subcarriers for transmission on a first carrier by performing a first inverse fast Fourier transform and a parallel to serial conversion; and
combine a second set of data subcarriers for transmission on a second carrier by performing a second inverse fast Fourier transform and a parallel to serial conversion.

22. The point-to-point receiver according to claim 21, wherein the data subcarriers of the first set are adjacent to the data subcarriers of the second set.

23. The point-to-point receiver according to claim 21, wherein the instructions to combine the first set of the data subcarriers and the instructions to combine the second set of data subcarriers are performed in parallel.

24. The point-to-point receiver according to claim 21, wherein the first set of data subcarriers form part of a transmission signal in accordance with Long Term Evolution, LTE and the second set of data subcarriers form part of a transmission signal in accordance with LTE.

25. A point-to-point receiver comprising:
means for receiving one input signal on the input, the input signal having been transferred from a point-to-point transmitter over a point-to-point medium, wherein the point-to-point medium is not a link between a radio base station and a wireless device;
means for separating frequency components of the input signal to a plurality of data subcarriers for respective frequency components by performing a serial to parallel conversion and a fast Fourier transform;
means for combining a first set of the data subcarriers for transmission on a first carrier by performing a first inverse fast Fourier transform and a parallel to serial conversion; and
means for combining a second set of data subcarriers for transmission on a second carrier by performing a second inverse fast Fourier transform and a parallel to serial conversion.

26. A non-transitory medium comprising computer program for extracting signal streams in a point-to-point receiver comprising a receiver input, the computer program comprising computer program code which, when run on the point-to-point receiver cause the point-to-point receiver to:
receive one input signal on the input, the input signal having been transferred from a point-to-point transmitter over a point-to-point medium, wherein the point-to-point medium is not a link between a radio base station and a wireless device;
separate frequency components of the input signal to a plurality of data subcarriers for respective frequency components by performing a serial to parallel conversion and a fast Fourier transform;
combine a first set of the data subcarriers for transmission on a first carrier by performing a first inverse fast Fourier transform and a parallel to serial conversion; and
combine a second set of data subcarriers for transmission on a second carrier by performing a second inverse fast Fourier transform and a parallel to serial conversion.

27. A system for point-to-point communication comprising a point-to-point transmitter and a point-to-point receiver,
wherein the point-to-point transmitter comprises:
a plurality of frequency component inputs;
a transmitter output;
a processor; and
a memory storing instructions that, when executed by the processor, cause the point-to-point transmitter to:
receive a first set of data subcarriers for a first signal stream on respective frequency component inputs, the first signal stream intended to be transmitted on a first carrier;
receive a second set of data subcarriers for a second signal stream on respective frequency component inputs, the second signal stream intended to be transmitted on a second carrier;
combine all frequency component inputs to one output signal by performing an inverse fast Fourier transform of all frequency component input and a parallel to serial conversion; and
provide the output signal on the output for transmission to the point-to-point receiver over a point-to-point medium, wherein the point-to-point medium is not a link between a radio base station and a wireless device;
wherein the point-to-point receiver comprises:
a receiver input;
a processor; and
a memory storing instructions that, when executed by the processor, cause the point-to-point receiver to:
receive one input signal on the input, the input signal having been transferred from the point-to-point transmitter over the point-to-point medium;

separate frequency components of the input signal to a plurality of data subcarriers for respective frequency components by performing a serial to parallel conversion and a fast Fourier transform;

combine a first set of the data subcarriers for transmission on a first carrier by performing a first inverse fast Fourier transform and a parallel to serial conversion; and combine a second set of data subcarriers for transmission on a second carrier by performing a second inverse fast Fourier transform and a parallel to serial conversion.

\* \* \* \* \*